US011881649B2

(12) United States Patent
Kliever

(10) Patent No.: US 11,881,649 B2
(45) **Date of Patent: *Jan. 23, 2024**

(54) HIGH-CURRENT CONNECTOR AND METHOD FOR MOUNTING SAME

(71) Applicant: HARTING ELECTRIC GMBH & CO. KG, Espelkamp (DE)

(72) Inventor: Wilhelm Kliever, Minden (DE)

(73) Assignee: HARTING Electric GmbH & Co. KG, Espelkamp (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,922

(22) Filed: May 6, 2022

(65) Prior Publication Data

US 2022/0407259 A1 Dec. 22, 2022

Related U.S. Application Data

(63) Continuation of application No. 17/055,521, filed as application No. PCT/DE2019/100429 on May 10, 2019, now Pat. No. 11,336,047.

(30) Foreign Application Priority Data

May 16, 2018 (DE) ..................... 10 2018 111 734.5

(51) Int. Cl.
*H01R 13/436* (2006.01)
*H01R 4/60* (2006.01)
(Continued)

(52) U.S. Cl.
CPC ........... *H01R 13/4364* (2013.01); *H01R 4/60* (2013.01); *H01R 13/04* (2013.01); *H01R 13/111* (2013.01);
(Continued)

(58) Field of Classification Search
CPC ...... H01R 13/4364; H01R 4/60; H01R 13/04; H01R 13/111; H01R 31/08; H01R 43/20;
(Continued)

(56) References Cited

U.S. PATENT DOCUMENTS 3,825,874 A 7/1974 Peverill
4,362,350 A 12/1982 von Harz
(Continued)

FOREIGN PATENT DOCUMENTS

CN 200976418 Y 11/2007
DE 19513880 A1 10/1996
(Continued)

OTHER PUBLICATIONS

European Patent Office, International Search Report and Written Opinion for international application No. PCT/DE2019/100429, dated Aug. 22, 2019, 11 pages (with English translation of International Search Report).
(Continued)

*Primary Examiner* — Travis S Chambers
(74) *Attorney, Agent, or Firm* — Seed IP Law Group LLP

(57) ABSTRACT

A high-current connector includes an insulating body which has at least one contact carrier having at least one contact chamber, which has at least two through-openings on the plug-in side, and at least two electrically conductive plug-in contacts which are arranged parallel to one another in the contact chamber and each have a cable connection region at a first end and a plug-in region opposite at a second end, the plug-in regions of the plug-in contacts being guided through one of the through-openings each of the contact chamber. The high-current plug connector also has an electrically conductive connection element which is inserted into the contact chamber and which has at least two contact receptacles, into each of which one of the plug-in contacts is
(Continued)

inserted interlockingly and frictionally by its plug-in region, and the at least two plug-in contacts are electrically conductively connected to one another by the connection element.

9 Claims, 4 Drawing Sheets

(51) Int. Cl.

| | |
|---|---|
| ***H01R 13/04*** | (2006.01) |
| ***H01R 13/11*** | (2006.01) |
| ***H01R 43/20*** | (2006.01) |
| ***H01R 31/08*** | (2006.01) |
| *H01R 24/22* | (2011.01) |

(52) U.S. Cl.
CPC ............ *H01R 31/08* (2013.01); *H01R 43/20* (2013.01); *H01R 24/22* (2013.01)

(58) Field of Classification Search
CPC .... H01R 24/22; H01R 9/0512; H01R 13/652; H01R 13/658; H01R 13/6585; H01R 13/6588; H01R 13/6591; H01R 13/6596
See application file for complete search history.

(56) References Cited

U.S. PATENT DOCUMENTS

| | | | | |
|---|---|---|---|---|
| 4,544,220 | A | 10/1985 | Aiello et al. | |
| 4,580,863 | A | 4/1986 | Lohr et al. | |
| 5,160,282 | A | 11/1992 | Swaffield et al. | |
| 5,310,364 | A * | 5/1994 | Hooper .................. | H01R 31/08 439/724 |
| 6,027,349 | A | 2/2000 | Chang | |
| 9,472,887 | B1 | 10/2016 | Horning et al. | |
| 10,535,960 | B2 | 1/2020 | Meier et al. | |
| 11,336,047 | B2 * | 5/2022 | Kliever .............. | H01R 13/4364 |
| 2012/0322298 | A1 * | 12/2012 | Aime ..................... | H01R 31/02 439/510 |
| 2013/0089996 | A1 | 4/2013 | Zhao | |
| 2021/0203095 | A1 | 7/2021 | Kliever | |

FOREIGN PATENT DOCUMENTS

| | | | |
|---|---|---|---|
| DE | 112012004155 | T5 | 7/2014 |
| EP | 0735627 | A2 | 10/1996 |
| EP | 1094566 | B1 | 10/2003 |
| EP | 2539966 | B1 | 4/2015 |
| GB | 853694 | A | 11/1960 |

OTHER PUBLICATIONS

German Patent Office, Office Action for German application No. 10 2018 111 734.5 dated Feb. 1, 2019, 7 pages.
International Preliminary Report on Patentability, dated Nov. 17, 2020; for International Application No. PCT/DE2019/100429, 9 pages.

* cited by examiner

HIGH-CURRENT CONNECTOR AND METHOD FOR MOUNTING SAME

CROSS-REFERENCE TO RELATED APPLICATIONS

This application is a continuation of U.S. patent application Ser. No. 17/055,521, filed Nov. 13, 2020, now U.S. Pat. No. 11,336,047, which is a US national stage application of international application No. PCT/DE2019/100429, filed May 10, 2019, which claims priority to German application No. 10 2018 111 734.5, filed May 16, 2018, the contents of each of which are hereby incorporated by reference in their entirety.

BACKGROUND

Technical Field

This disclosure is related to a high-current plug-in connector and a method for assembling a high-current plug-in connector.

Description of the Related Art

High-current plug-in connectors generally have at least one insulating body and a plurality of plug-in contacts, which are arranged in said insulating body, and are required in order to transmit currents of high current intensities, called “high currents” for short, to corresponding mating contacts of a mating plug in the plugged-in state. Here and below, the terms “high current intensities”/“high currents” mean, in particular, that a plug-in connection of this kind can transmit a current of, for example, at least 24 amperes, preferably at least 32 amperes and, in a particularly preferred refinement, even 40 amperes and above, for each plug-in contact. In particular, said plug-in contacts can be designed, for example, for current intensities of 70 amperes.

In order to produce the particularly good conductances which are required for transmitting high currents, particularly strong plug-in contact-making forces are generally required. These are accompanied by correspondingly high plug-in and tensile forces when plugging in and pulling out the plug-in connectors. Therefore, stringent requirements are made of the fastening of the plug-in contacts, in particular of the pin and socket contacts in the insulating body. To this end, the insulating body can have, on the cable connection side, a contact holding plate which can be releasably fixed to said insulating body and on which holding elements, which can be designed in particular in the form of lamellae, are integrally formed for particularly stable fastening of the plug-in contacts in the insulating body.

In the prior art, it is frequently necessary to “bridge,” for example, two plug-in contacts of a plug-in connector, that is to say, to electrically conductively connect said two plug-in contacts. This is often also referred to as “splitting” or as a “Y distribution” and generally serves to distribute the current of a sufficiently load-carrying power source to a plurality of sinks, this being called “potential multiplication” using technical terminology. To this end, it is known, for example, to separate a cable, for example, the braids of a braided cable, into a plurality of parts and to allocate said cable to the connection regions of a plurality of, for example, two, plug-in contacts. However, this technique is at least questionable from a variety of safety-related aspects and is frowned upon in professional circles in particular.

Document CN 200976418 Y discloses a cost-effective electrical connecting structure which is designed using stamping and bending technology. In this case, a plurality of contacts can be, in particular, formed in one piece using stamping and bending technology and in this way can be electrically conductively connected to one another.

Document EP 0 735 627 A2 discloses a multipole electrical plug-in connector. This has an insulating housing and plug-in contacts which are arranged in said insulating housing. The plug-in contacts consist of contact pins and contact sockets which are designed in a complementary manner to said contact pins. A plurality of plug-in contacts are arranged in a row transversely in relation to their plug-in direction pole by pole. The plug-in contacts which are arranged in a row are electrically connected to one another by way of at least one connecting pin which runs in the direction of the row. The connecting pin and the plug-in contacts which are connected to one another together form a pole unit which is inserted into the insulating housing from the outside in the plug-in direction.

Furthermore, document EP 2 539 966 B1 discloses a distributor plug unit for electrical installations with a rating of 16 A at 240 V. Metal bridging elements are disclosed for connecting in each case one (plug-in contact) pin of a first group to a (plug-in contact) pin of a second group. Said metal bridging elements are designed in the form of a planar plate which extends substantially in the plane ( . . . ) and includes a bent-back section (M) integrally at each end, said section defining an elastically deformable open sleeve which encloses and embraces a metal pin ( . . . ).

One disadvantage of this prior art is that this design is unsuitable for high-current plug-in connectors within the meaning of the definition cited at the outset. Finally, in this design, the (plug-in contact) metal pins have to have an appropriate length in order to provide a plug-in contact section around which the open sleeve can engage in a flat manner. Accordingly, it would then also be difficult to mechanically fasten said sleeve in the insulating body. Construction of the high-current plug-in connector which is compact as desired therefore cannot be realized from a mechanical respect given a design of this kind.

The German Patent and Trademark Office has searched the following prior art for the priority application in respect of the present application: DE 195 13 880 A1, DE 11 2012 004 155 T5, GB 853 694 A, U.S. Pat. No. 4,544,220 A, EP 2 539 966 B1, EP 0 735 627 A2, CN 200 976 418 Y.

BRIEF SUMMARY

According to embodiments of the invention, a compact design for a high-current plug-in connector is provided which is also suitable for transmitting high currents of 24 A and above, in particular for transmitting, for example, 70 A.

For instance, according to an embodiment of the invention, a high-current plug-in connector is provided and includes an insulating body with a contact carrier. The contact carrier has at least one contact chamber which has at least two plug-side passage openings. Furthermore, the high-current plug-in connector has at least two electrically conductive plug-in contacts which are arranged parallel to one another in the contact chamber. The plug-in contacts each have, at a first end, a cable connection region and opposite to this, at a second end, a plug-in region. These plug-in regions are guided through in each case one of the passage openings of the contact chamber.

Furthermore, the high-current plug-in connector has an electrically conductive connecting element which is inserted into the contact chamber. The connecting element has at least two contact receptacles into which in each case one of the plug-in contacts is inserted, by way of its plug-in region, in an interlocking and force-fitting manner. The at least two plug-in contacts are electrically conductively connected to one another by way of the connecting element.

According to another embodiment of the invention, a method for assembling a high-current plug-in connector is provided and comprises the following:

- inserting at least one connecting element into at least one contact chamber, which is open on the cable connection side, of a contact carrier, so that the connecting element, by way of contact receptacles which are arranged in said connecting element, is arranged in the vicinity of plug-side passage openings of the contact chamber;
- mounting an insulating body by attaching a contact holding plate to the contact carrier and in this way at the same time fixing the at least one connecting element in the insulating body;
- crimping at least one electrical line of an electric high-current cable to a cable connection region of at least one plug-in contact; and
- inserting the crimped plug-in contact on the cable connection side and inserting at least one further plug-in contact through in each case one contact opening of the contact holding plate into a common contact chamber of the contact carrier, wherein at least these two plug-in contacts latch in the insulating body and at the same time each pass through one of the contact receptacles of the connecting element, and in this way electrically conductively connecting these at least two plug-in contacts, which are latched in the insulating body, specifically the crimped plug-in contact and the at least one further plug-in contact, by way of the connecting element.

In an advantageous refinement, the plug-in contacts are socket contacts, in particular for safety reasons.

In a further advantageous refinement, the connecting element can have a sufficiently high degree of elasticity in order to receive and to hold the plug-in contacts and to be able to release said plug-in contacts again without destruction. This is particularly advantageous for contact-connecting the connecting element to the plug-in contacts. In this way, the plug-in contacts can be automatically connected to the connecting element in an interlocking and force-fitting manner when they are inserted into the insulating body, and in the process can make electrical contact with said insulating body.

In a further refinement, the connecting element consists of metal, in particular of brass, and is of flat design, wherein its surface area runs at a right angle in relation to the plug-in direction in the inserted state. This ensures a high degree of robustness, excellent long-term stability and at the same time a small space requirement.

The at least two contact receptacles of the connecting element can each be formed by an open ring. This is particularly advantageous because rotationally symmetrical plug-in contacts can be inserted into said contact receptacles at least in sections as a result.

In particular, the open ring can be formed by way of the at least two contact receptacles of the connecting element each having two sickle-shaped arms, the ends of which are directed toward one another. This is particularly advantageous because the desired elasticity which is required in order to receive the plug-in contacts with a desired contact force can be set with the greatest possible stability as a result.

In order to insert the plug-in contacts, the contact chambers in the contact carrier can be open on the cable connection side. The insulating body further has a contact holding plate which can be releasably fixed to the contact carrier on the plug-in side and through which the plug-in contacts are guided and on which said plug-in contacts are held, wherein the contact holding plate interacts with the contact carrier for inserting and fixing the plug-in contacts in the insulating body. In particular, the contact holding plate can have special holding elements for this purpose, for example, lamellae. This construction has the additional advantage that the connecting element can be arranged between the plug-side passage openings and the contact holding plate, in particular the holding elements of said contact holding plate, for example, the lamellae of said contact holding plate.

Furthermore, the contact carrier can have, at its passage openings on the plug-in side, hollow-cylindrical moldings as touch-protection means or devices, which hollow-cylindrical moldings comprise the plug-in regions, which are guided through the passage openings, of the plug-in contacts and project beyond said plug-in regions on the plug-in side. These hollow-cylindrical moldings further have, in addition to said touch-protection means or devices, the function of extending clearances and creepage paths and of preventing flashovers, even at high voltages.

BRIEF DESCRIPTION OF THE SEVERAL VIEWS OF THE DRAWINGS

An exemplary embodiment of the invention is illustrated in the drawings and will be explained in more detail below. In the drawings.

The figures may contain partially simplified, schematic illustrations. In some cases, identical reference signs are used for elements which are similar but may not be identical. Different views of similar elements could be drawn to different scales.

DETAILED DESCRIPTION

Figure 1A:
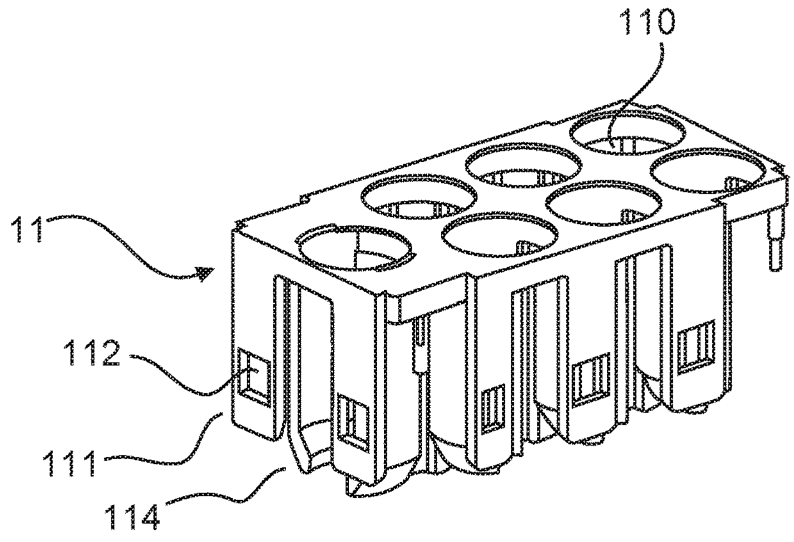
FIGS. 1*a-e* show an insulating body having a contact holding plate and a contact carrier.

FIG. 1*a* shows a contact holding plate 11 with lamellae 114 which serve to hold plug-in contacts 3 and the ground contact pin 3'. To this end, the plug-in contacts 3 and the ground contact pin 3' can be inserted through contact openings 110 on the cable connection side. Furthermore, the contact holding plate 11 has a plurality of latching lugs 111 with in each case one latching window 112 for latching to a contact carrier 12.

Figure 1B:
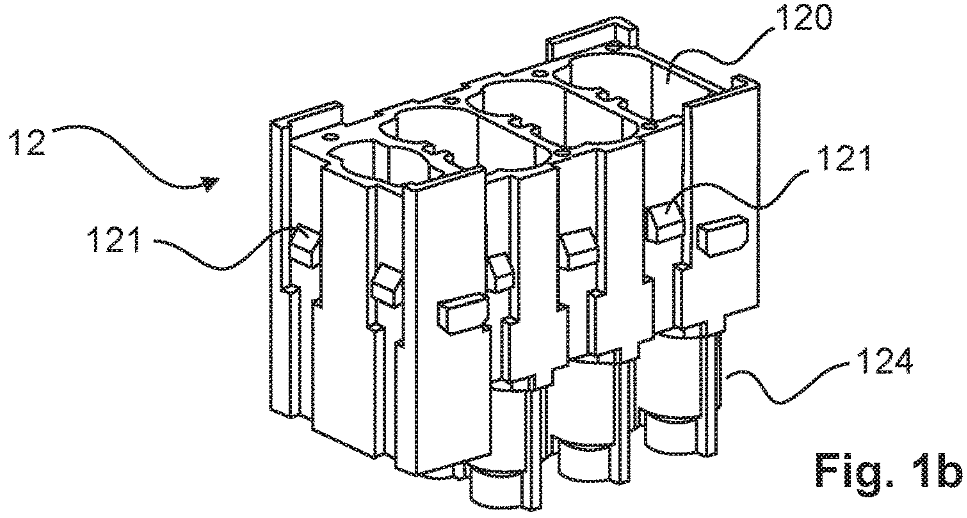

FIG. 1*b* shows an oblique plan view of the contact carrier 12, that is to say, looking obliquely at the cable connection side of said contact carrier 12. This contact carrier 12 has a plurality of contact chambers 120, which are open on a cable connection side, for receiving in each case two contacts 3. Opposite the cable connection side, the contact chambers 120 have in each case two passage openings which are not shown in the drawing and therefore are not provided with a reference sign. At these passage openings, the contact carrier 12 has hollow-cylindrical moldings 124 on the plug-in side for receiving in each case a plug-in region 32 of a respective one of the contacts 3. Furthermore, the contact carrier 12 has latching pegs 121 to which the latching lugs 111 of the contact holding plate 11 can latch. The contact carrier 12 also has a ground contact chamber, not denoted in any detail for reasons of clarity, for receiving a ground contact pin 3'.

Figure 1C:
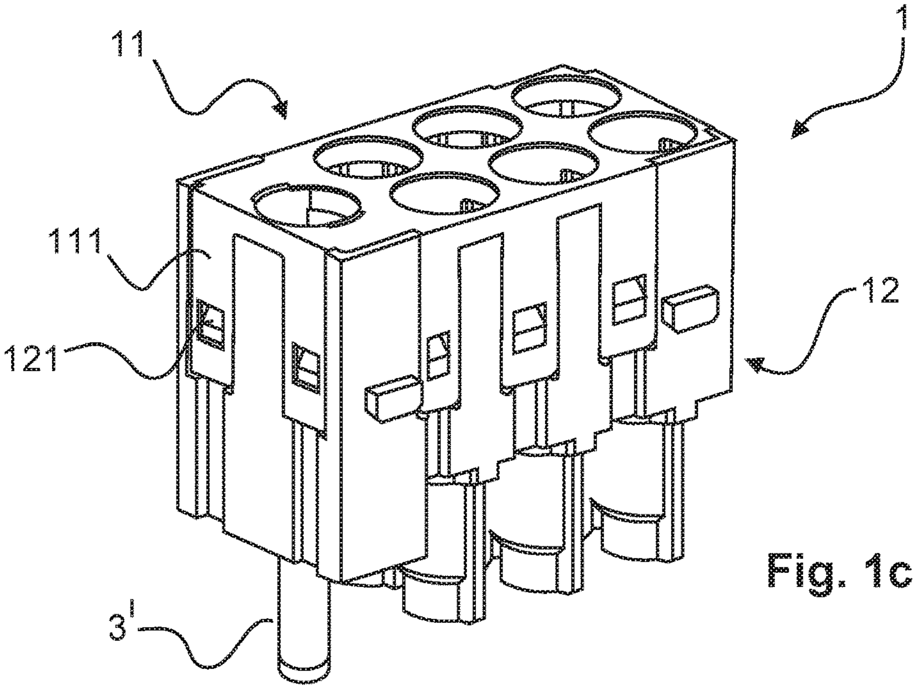

FIG. 1*c* shows the mounted insulating body 1, that is to say, the contact carrier 12, to which the contact holding plate 11 is latched by way of its latching lugs 111, wherein the latching windows 112 latch on the latching pegs 121, and wherein the lamellae 114 engage into the contact chambers 120. The ground contact pin 3' is also illustrated.

Figure 1D:
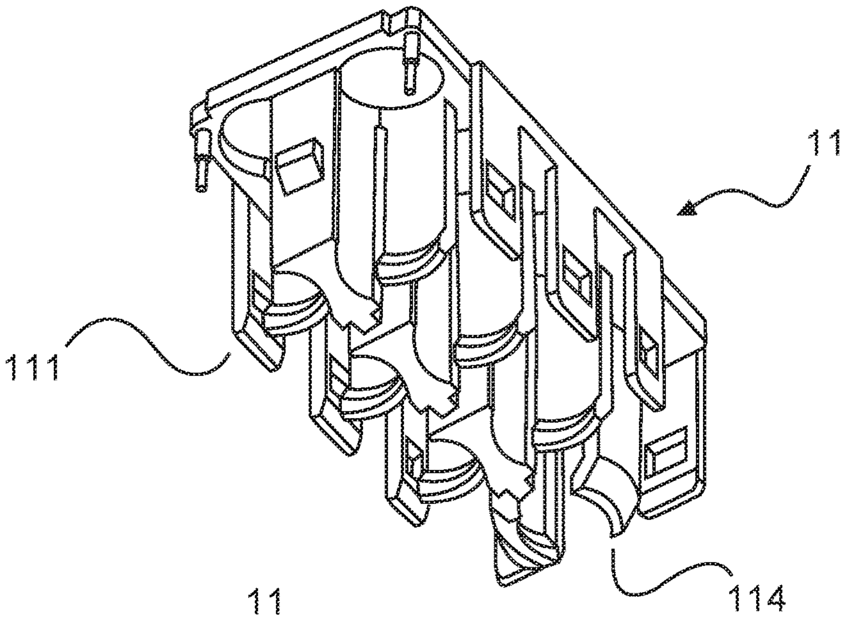

FIG. 1*d* shows the contact holding plate 11 looking at the lamellae 114 from the plug-in side.

Figure 1E:
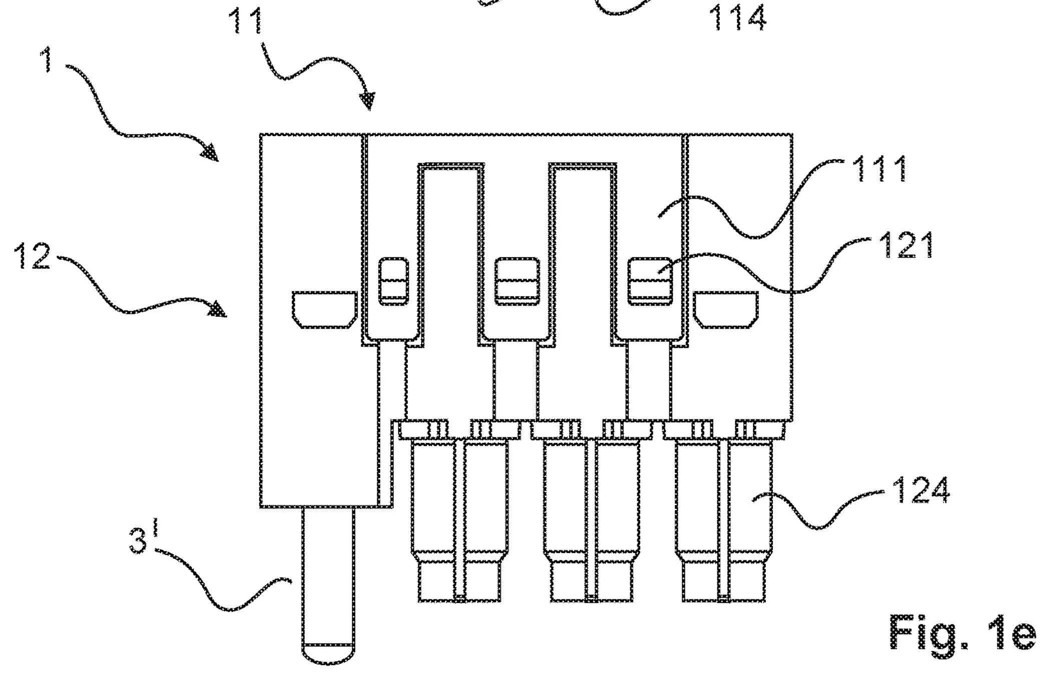

FIG. 1*e* shows a side view of the mounted insulating body 1.

Figure 1F:
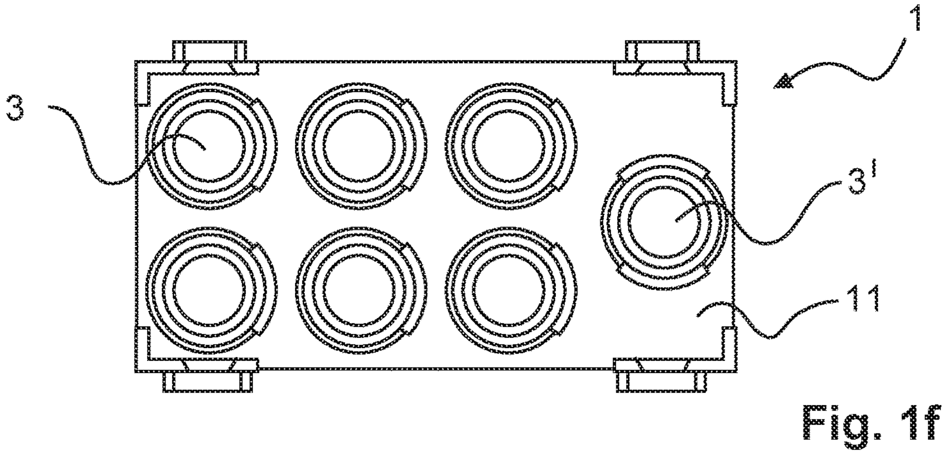
FIG. 1*f* shows a plan view of the insulating body with inserted contacts.

FIG. 1*f* shows a plan view of the insulating body 1 with inserted plug-in contacts 3, that is to say, looking at the contact holding plate 11.

Figure 2A:
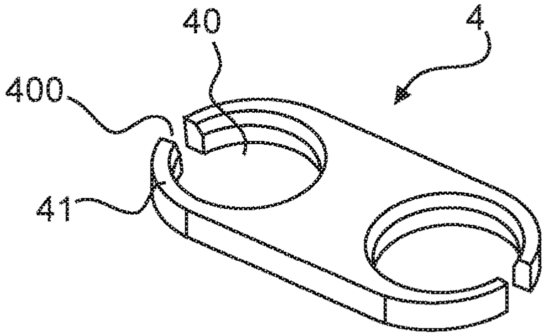
FIGS. 2*a-b* show various views of a connecting element.
Figure 2B:
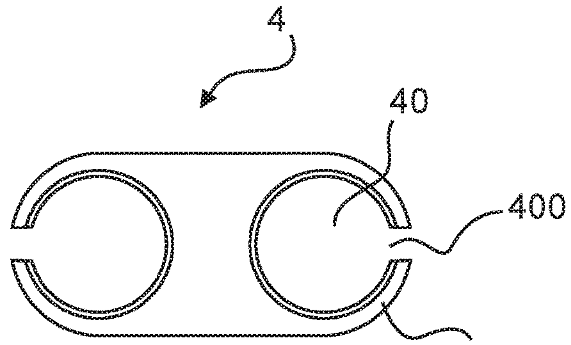

FIGS. 2*a* and 2*b* show a connecting element 4 which has two contact receptacles 40 into each of which a plug-in contact 3 can be inserted by way of its plug-in region 32 in an interlocking and force-fitting manner.

According to one particularly advantageous embodiment, the connecting element 4 consists of metal, in particular of brass, and is of flat design. This ensures a high degree of robustness, excellent long-term stability and at the same time a small space requirement.

The at least two contact receptacles 40 of the connecting element 4 of the illustrated embodiment are each formed by an open ring. The round ring shape is particularly advantageous because the plug-in contacts 3 which are to be inserted therein are of rotationally symmetrical design.

The open ring is formed by way of the at least two contact receptacles 40 of the connecting element 4 each having two sickle-shaped arms 41, the ends of which are directed toward one another. The two ends are therefore separated from one another by an opening 400. This is particularly advantageous because, owing to the configuration of the specific form thereof, the desired elasticity which is required in order to receive the plug-in contacts 3 with a desired contact force can be set with the greatest possible stability.

Figure 3A:
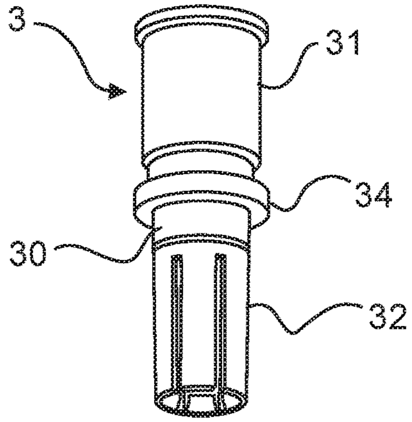
FIGS. 3*a-b* show various views of a plug-in contact.
Figure 3B:
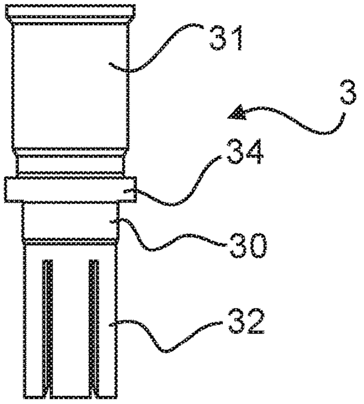

FIGS. 3*a* and 3*b* show the plug-in contact 3. Said plug-in contact has a cable connection region 31, which is designed as a crimp region, and a plug-in region 32. An encircling collar 34 is located between said cable connection region 31 and plug-in region 32 on the cable connection region side. On the plug-in region side, a connecting region 30 by way of which the plug-in contact 3 can be inserted into the contact receptacles 40 of the connecting element 4 adjoins the collar 34.

Figure 4A:
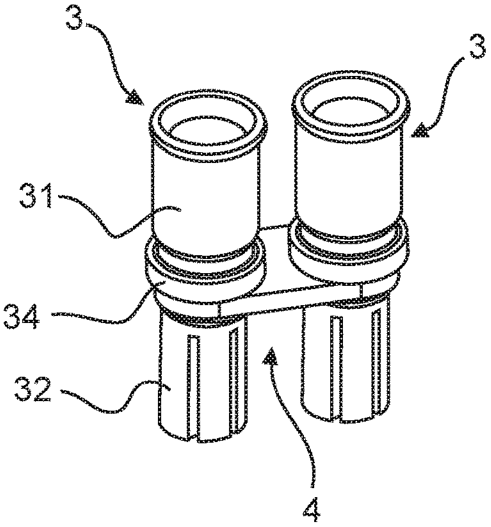
FIGS. 4*a-b* show two plug-in contacts with the connecting element.
Figure 4B:
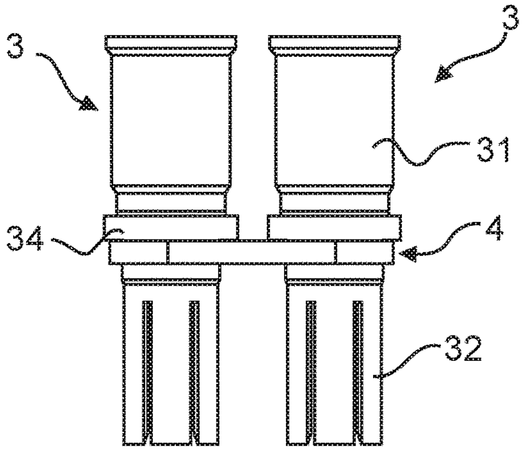

FIGS. 4*a* and 4*b* show an oblique plan view and a side view of two plug-in contacts 3 which are inserted into in each case one of the contact receptacles 40 of the connecting element 4. The respective plug-in region 32 is guided through the contact receptacles 40 and the plug-in contacts 3 make contact with the connecting element 4 by way of their connecting regions 30. In this case, the connecting element 4 encloses the connecting regions 30 by way of its contact receptacles 40 in an interlocking and force-fitting manner.

Figure 5A:
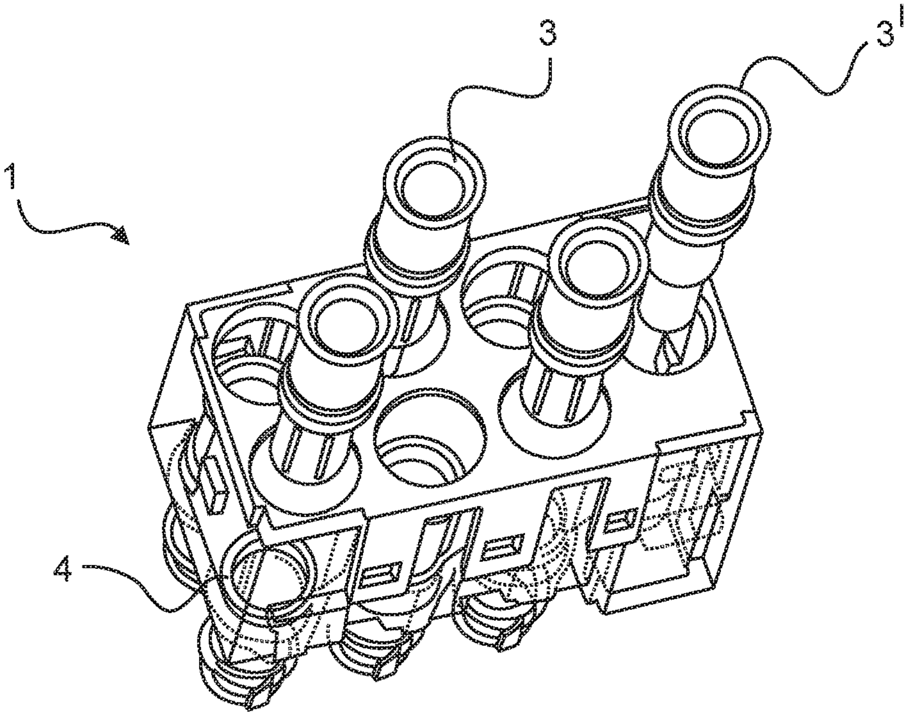
FIGS. 5*a-b* show an insulating body with inserted connecting elements and plug-in contacts which are inserted or to be inserted.

FIG. 5*a* shows the mounted insulating body 1 with plug-in contacts 3 which are partially inserted and partially to be inserted. In this case, four connecting elements 4 are inserted into in each case one contact chamber 120 and are fixed in the insulating body 1 by way of interaction of the contact holding plate 11 with the contact carrier 12 which is latched to said contact holding plate.

Figure 5B:
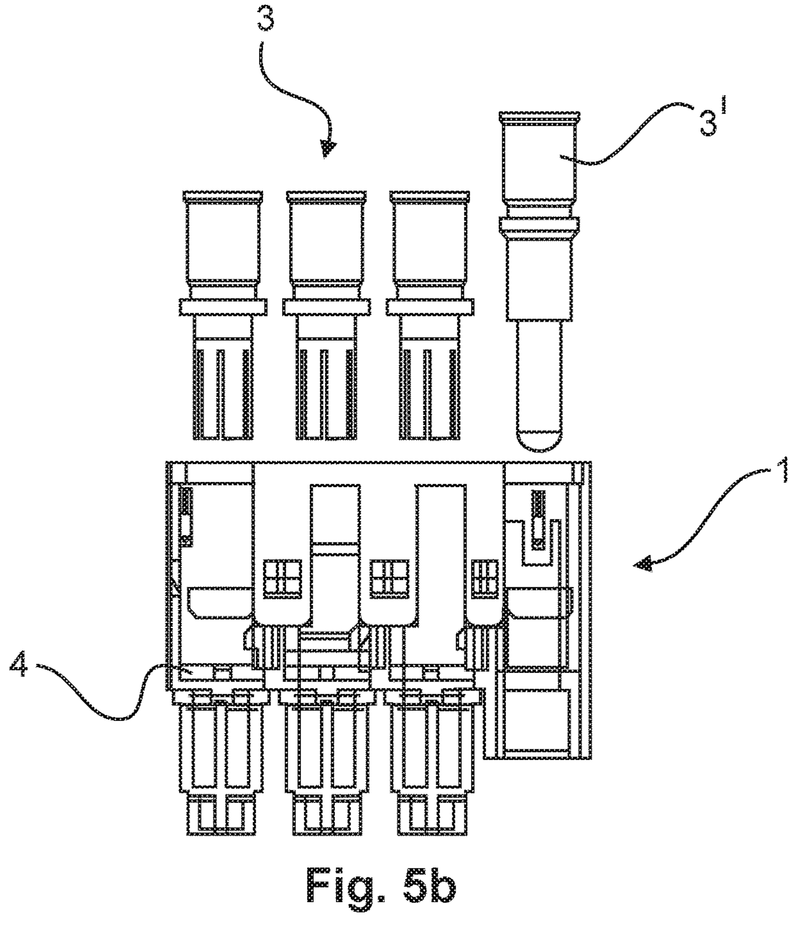

FIG. 5*b* shows a side view of the same arrangement. In this case, it is clear that the plug-in regions 32 of the contacts 3 which are already inserted are received in the hollow-cylindrical moldings 124, wherein the hollow-cylindrical moldings 124 protrude beyond the plug-in regions 32 on the plug-in side.

Even though various aspects or features of the invention are shown respectively in combination in the figures, it is clear to a person skilled in the art—unless stated otherwise—that the illustrated and discussed combinations are not the only ones possible. In particular, mutually corresponding units or feature complexes from different exemplary embodiments can be exchanged with one another.

Put another way, aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A high-current plug-in connector, comprising:

an insulating body with at least one contact carrier with at least one contact chamber which has at least two plug-side passage openings;

at least two electrically conductive plug-in contacts which are arranged parallel to one another in the contact chamber of the at least one contact carrier and which each have, at a first end, a cable connection region and opposite to the cable connection region, at a second end, a plug-in region, wherein the plug-in region of said plug-in contact is guided through in each case a respective one of the passage openings of the contact chamber; and an electrically conductive connecting element which is inserted into the contact chamber and which has at least two contact receptacles into which in each case a respective one of the plug-in contacts is inserted, by way of the plug-in region, in an interlocking and force-fitting manner, and by way of which the at least two plug-in contacts are electrically conductively connected to one another by the connecting element.

2. The high-current plug-in connector as claimed in claim 1, wherein the plug-in contacts are socket contacts.

3. The high-current plug-in connector as claimed in claim 1, wherein the connecting element has a sufficiently high degree of elasticity in order to receive and to hold the plug-in contacts and to be able to release said plug-in contacts again without destruction.

4. The high-current plug-in connector as claimed in claim 1, wherein the connecting element consists of metal and is of flat design, wherein a major surface area of the connecting element runs at a right angle in relation to a plug-in direction in an inserted state.

5. The high-current plug-in connector as claimed in claim 1, wherein the at least two contact receptacles of the connecting element are each formed by an open ring.

6. The high-current plug-in connector as claimed in claim 1, wherein the at least two contact receptacles of the connecting element each have two sickle-shaped arms, the ends of which are directed toward one another.

7. The high-current plug-in connector as claimed in claim 1, wherein the contact carrier has, at the passage openings on the plug-in side, hollow-cylindrical moldings as touch-protection devices, which hollow-cylindrical moldings receive the plug-in regions of the plug-in contacts, which are guided through the passage openings, and project beyond said plug-in regions on the plug-in side.

8. The high-current plug-in connector as claimed in claim 1, wherein the at least one contact chamber in the contact carrier is open on the cable connection side, and wherein the insulating body further has a contact holding plate which can be releasably fixed to the contact carrier on the cable connection side and through which the plug-in contacts are guided and on which said plug-in contacts are held, wherein the contact holding plate interacts with the contact carrier for inserting and fixing the plug-in contacts in the insulating body.

9. The high-current plug-in connector as claimed in claim 8, wherein the contact holding plate has lamellae for holding the plug-in contacts at least on one side and for interacting with the contact carrier in a fixing manner.

* * * * *